(12) United States Patent
Narumiya et al.

(10) Patent No.: US 11,635,534 B2
(45) Date of Patent: Apr. 25, 2023

(54) SEISMIC SENSOR

(71) Applicant: OMRON Corporation, Kyoto (JP)

(72) Inventors: Akinori Narumiya, Kusatsu (JP); Katsuyuki Yamamoto, Kusatsu (JP)

(73) Assignee: OMRON Corporation, Kyoto (JP)

( * ) Notice: Subject to any disclaimer, the term of this patent is extended or adjusted under 35 U.S.C. 154(b) by 275 days.

(21) Appl. No.: 17/173,246

(22) Filed: Feb. 11, 2021

(65) Prior Publication Data

US 2021/0302602 A1 Sep. 30, 2021

(30) Foreign Application Priority Data

Mar. 31, 2020 (JP) .............................. JP2020-064022

(51) Int. Cl.
*G01V 1/00* (2006.01)
(52) U.S. Cl.
CPC .................................... *G01V 1/008* (2013.01)
(58) Field of Classification Search
CPC ................................ G01V 1/008; G01V 1/18
See application file for complete search history.

(56) References Cited

U.S. PATENT DOCUMENTS

| 2016/0041014 | A1* | 2/2016 | Sameshima | G01D 3/10 |
| | | | | 702/127 |
| 2017/0003406 | A1* | 1/2017 | Ueda | G01V 1/162 |
| 2017/0059423 | A1* | 3/2017 | Suzuki | G01L 1/225 |
| 2018/0017689 | A1* | 1/2018 | Getz | G01V 1/184 |
| 2018/0188396 | A1* | 7/2018 | Sakuma | G01V 1/164 |
| 2021/0124070 | A1* | 4/2021 | Mino | G01V 1/18 |
| 2021/0302602 | A1* | 9/2021 | Narumiya | G01V 1/008 |

FOREIGN PATENT DOCUMENTS

| CN | 212207692 | U | * | 12/2020 | | |
| CN | 112393118 | A | * | 2/2021 | ............... | F17D 1/02 |
| CN | 113466928 | A | * | 10/2021 | ............ | G01V 1/008 |
| JP | 2013-108847 | A | | 6/2013 | | |
| JP | 2017-15604 | A | | 1/2017 | | |
| JP | 2018151290 | A | * | 9/2018 | ............ | G01V 1/008 |
| JP | 2021162461 | A | * | 10/2021 | ............ | G01V 1/008 |
| WO | WO-2017002946 | A1 | * | 1/2017 | ............... | G01H 1/00 |
| WO | WO-2018168101 | A1 | * | 9/2018 | ............ | G01V 1/008 |
| WO | WO-2019003504 | A1 | * | 1/2019 | ............ | G01V 1/008 |

* cited by examiner

*Primary Examiner* — Daniel Pihulic (74) *Attorney, Agent, or Firm* — Metrolex IP Law Group, PLLC (57) ABSTRACT

A seismic sensor may include a simple earthquake detection mode in which measured acceleration data is not saved, and which mode is continued in a case in which the measured acceleration is equal to or less than a predetermined first threshold value. An earthquake detection mode may further be included in which the measured acceleration data is saved, and which mode is continued in a case in which the acceleration measured in the simple earthquake detection mode is greater than the first threshold value and equal to or less than a second threshold value that is greater than the first threshold value. An earthquake measurement mode may further be included in which the acceleration data and a spectrum intensity (SI) value are measured and saved, and which mode is continued in a case in which the acceleration measured in the earthquake detection mode is greater than the second threshold value.

15 Claims, 6 Drawing Sheets

SEISMIC SENSOR

CROSS-REFERENCE TO RELATED APPLICATION

This application claims priority to prior Japanese Patent Application No. 2020-064022 filed with the Japan Patent Office on Mar. 31, 2020, the entire contents of which are incorporated herein by reference.

FIELD

The disclosure relates to a seismic sensor.

BACKGROUND

It is especially desirable to reduce standby power consumption for a battery-powered device, such as a seismic sensor provided in a meter box, for example, and used to shut off gas or electricity in an event of an occurrence of an earthquake. However, while being capable of obtaining an index value for evaluating a seismic scale by arithmetic processing, a seismic sensor using a micro controller unit (MCU) tends to consume large amount of power as compared with a mechanical seismic sensor energized by conventionally used vibration.

There is conventionally a seismic sensor that determines, after shifting from a mode with reduced power consumption to a measurement mode, whether an earthquake has occurred. In a case in which it is determined that an earthquake has not occurred, the seismic sensor returns to the mode with reduced power consumption. With a conventional type of seismic sensor, there is proposed a technology that improves accuracy of determination by filtering measured accelerations and removing a noise component (for example, Japanese Patent Application Laid-Open No. 2017-15604).

In addition, there has been proposed a seismometer that accurately distinguishes whether detected vibration is noise or an earthquake by raising a trigger level according to a calculated noise level. A set threshold value is set for a possibility of delayed earthquake detection. In a case in which the noise level continuously exceeds the threshold value for a certain period of time, an abnormality alarm unit of the seismometer emits an alarm to inform of an occurrence of abnormality with which an earthquake cannot be accurately detected, allowing for an accurate grasp of a possibility of a delayed earthquake detection (for example, Japanese Patent Application Laid-Open No. 2013-108847).

A seismic sensor as the seismic sensor for earthquake measurement described above is required to be capable of acquiring data of a vibration acceleration before earthquake detection for a purpose of examining the acceleration before and after an occurrence of an earthquake, in addition to reducing power consumption and increasing sensitivity of earthquake detection accuracy.

Meanwhile, it is conceivable to constantly acquire acceleration data at regular intervals before detecting an earthquake and shifting to a measurement mode. In that case, there sometimes has been a difficulty in providing guarantee for operation of a battery-powered seismic sensor over a long period of time such as five years or ten years. Alternatively, it has been disadvantageous in that a user needs to replace batteries more frequently, which is troublesome.

SUMMARY

A seismic sensor according to one or more embodiments is disclosed, which may include a logger function capable of acquiring data of a vibration acceleration even before earthquake detection, the seismic sensor being capable of reducing power consumption as much as possible.

In one or more embodiments, a seismic sensor may include the above-described logger function while still be capable of simplified operation.

A seismic sensor according to one or more embodiments may be provided in which an operation mode related to earthquake detection or measurement of an earthquake acceleration that switches modes according to a measured acceleration. A seismic sensor may include a simple earthquake detection mode in which the measured acceleration data is not saved, the simple earthquake detection mode being continued in a case in which the measured acceleration is equal to or less than a predetermined first threshold value, an earthquake detection mode in which the measured acceleration data is saved, the earthquake detection mode being continued in a case in which the acceleration measured in the simple earthquake detection mode is greater than the first threshold value and equal to or less than a second threshold value that is greater than the first threshold value, and an earthquake measurement mode in which the acceleration data and a spectrum intensity (SI) value are measured and saved, the earthquake measurement mode being continued in a case in which the acceleration measured in the earthquake detection mode is greater than the second threshold value.

According to one or more embodiments, earthquake detection with low power consumption may be possible, because an acceleration is measured even in the simple earthquake detection mode in which saving processing of an earthquake acceleration is not performed. In addition, if an acceleration measured in the simple earthquake detection mode is equal to or greater than a predetermined first threshold value, the operation mode switches to the earthquake detection mode, and the acceleration is measured and saved. Therefore, it is possible to record acceleration data before an occurrence of an earthquake. In addition, if an acceleration measured in the earthquake detection mode is equal to or greater than a predetermined second threshold value, the operation mode switches to the earthquake measurement mode, and an SI value in addition to the acceleration is measured and saved. Therefore, it is possible to record an index of an effect that a seismic motion has on a structure, in a case in which a large acceleration with which an occurrence of an earthquake is determined occurs. That is, according to one or more embodiments, it may be possible to acquire acceleration information before an occurrence of an earthquake with low power consumption.

In addition, the seismic sensor according to one or more embodiments may include an information processing device and an acceleration sensor, in which, in the simple earthquake detection mode, the information processing device is in an OFF state, and the acceleration sensor is in an ON state, and in the earthquake detection mode or in the earthquake measurement mode, the information processing device is in a state of intermittent drive, and the acceleration sensor is in an ON state. With the above described arrangement, the information processing device is in an OFF state in the simple earthquake detection mode. Therefore, power consumption may be reduced more reliably. In addition, because a low-power consumption acceleration sensor is in an ON state, it is possible to detect an earthquake from micro-vibration before an occurrence of an earthquake.

Further, a seismic sensor according to one or more embodiments may further include a memory configured to save the acceleration data, in which data saving for the earthquake detection mode and the earthquake measurement mode are divided into periods according to a predetermined acceleration data acquisition period, in which acceleration data measured by the acceleration sensor is temporarily saved in a memory in the information processing device every time the acceleration data acquisition period elapses, and the acceleration data temporarily saved in the memory in the information processing device is saved in the memory after the earthquake measurement mode ends. With the above described arrangement, the seismic sensor may acquire acceleration data triggered by an earthquake.

Furthermore, a seismic sensor according to one or more embodiments may be a seismic sensor in which the acceleration data acquisition period is 20 seconds, and acceleration data saved in the memory after the earthquake measurement mode ends may comprise acceleration data acquired during an all data acquisition period in the earthquake measurement mode and acceleration data acquired during a data acquisition period immediately before an occurrence of an earthquake in the earthquake detection mode. With the above described arrangement, it may be possible to record acceleration data immediately before an occurrence of an earthquake, in addition to during the earthquake.

Moreover, the seismic sensor according to one or more embodiments may be a seismic sensor that switches to the simple earthquake detection mode after completion of saving acceleration data acquired in the earthquake measurement mode during all of the data acquisition periods. With the above described arrangement, it may be possible to acquire acceleration data at a time of an occurrence of an earthquake with high reliability, by which power consumption may be reduced. In addition, it may be possible to continue measurement of an acceleration with low power consumption again after an end of an earthquake that has occurred once.

The seismic sensor may be capable of, with a logger function, acquiring data of a vibration acceleration before an earthquake detection, and is capable of reducing power consumption in acceleration measurement before the earthquake detection.

DETAILED DESCRIPTION

Application Example

Figure 1:
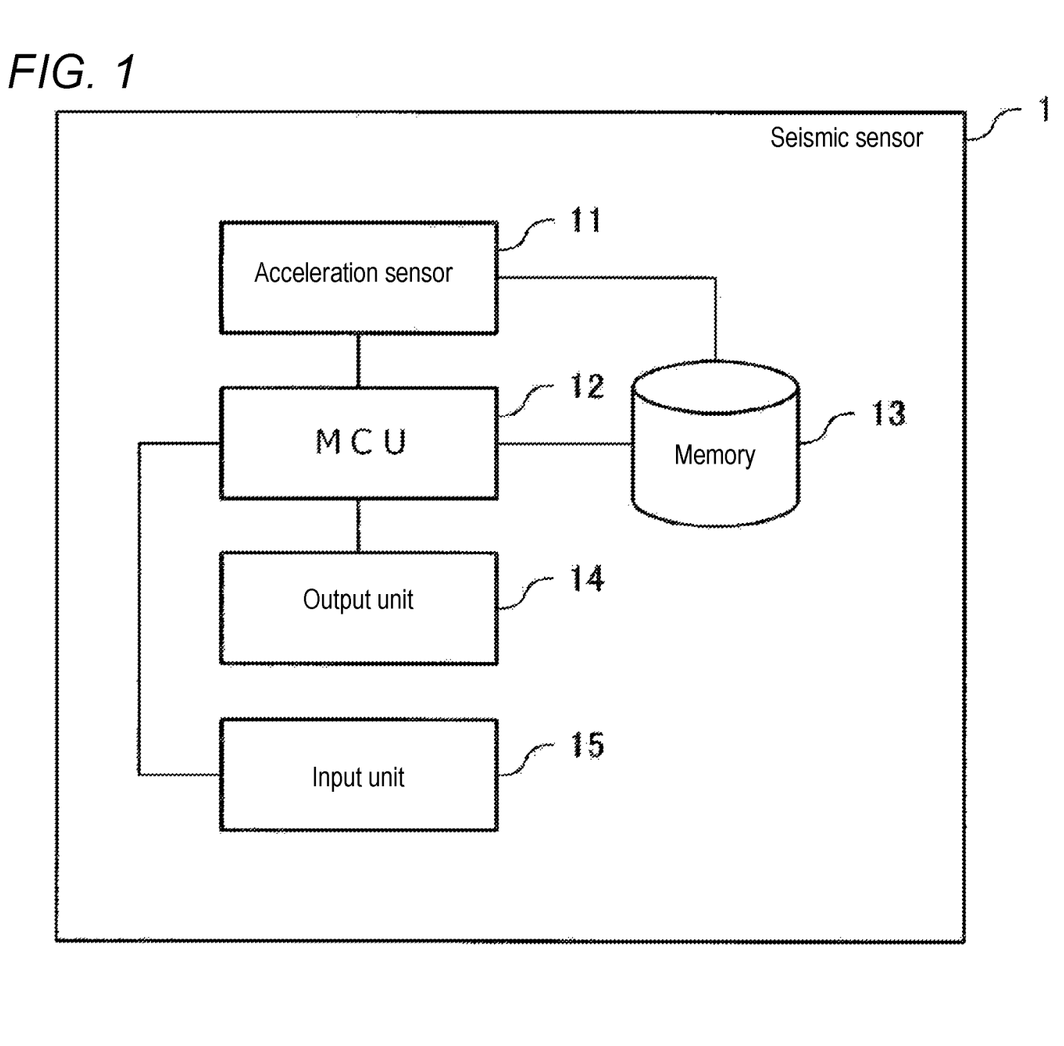
FIG. 1 is a diagram illustrating an exemplary device configuration associated with a seismic sensor in accordance with one or more embodiments.
Figure 5:
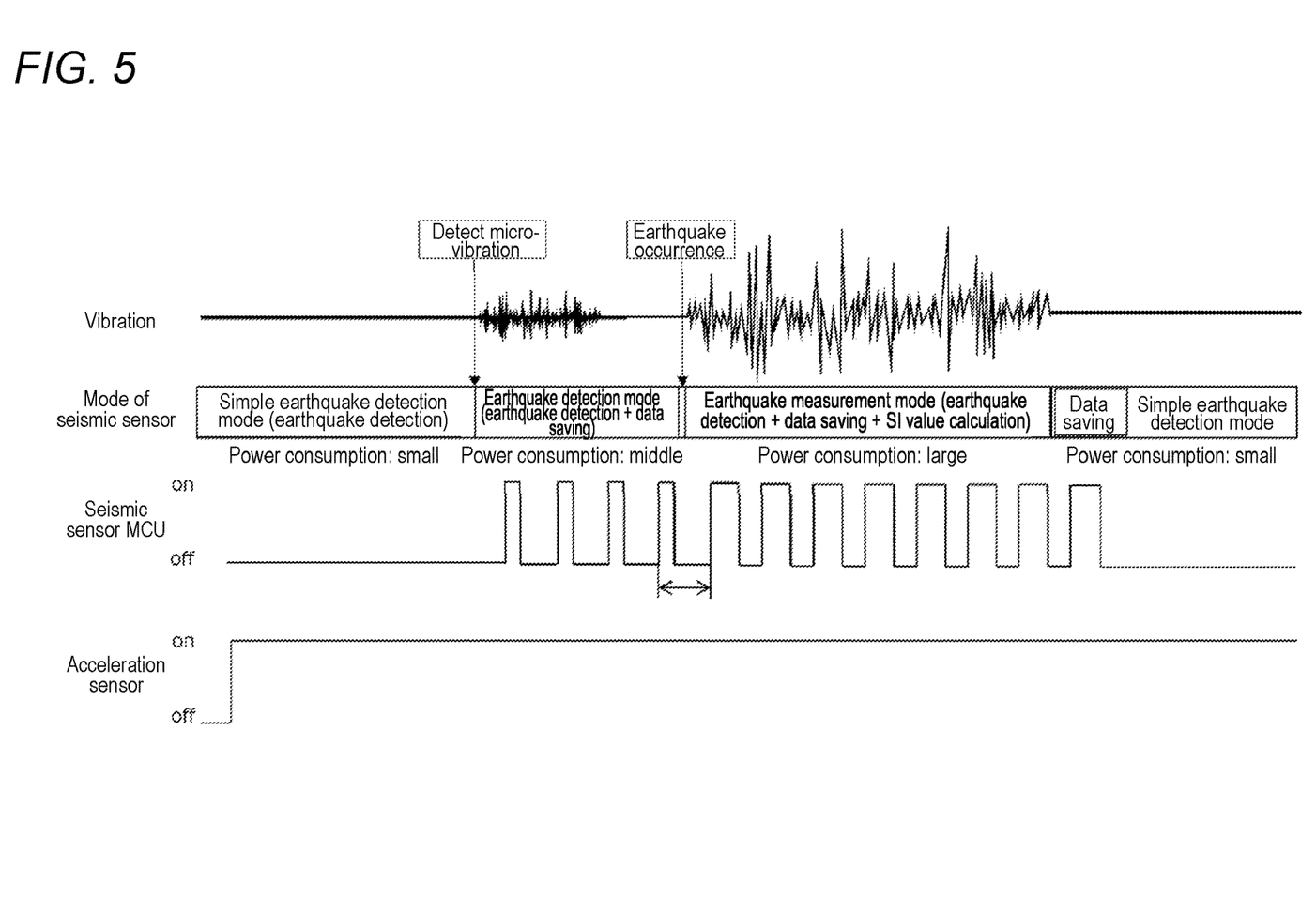
FIG. 5 is a diagram illustrating operation mode of a seismic sensor in accordance with one or more embodiments.

In accordance with one or more embodiments a logger function is described for executing acceleration data acquisition and a simple earthquake detection mode, which is an operation mode for reducing power consumption, that are applied to a seismic sensor. As illustrated in FIG. 1, the seismic sensor related to the present example includes an acceleration sensor 11, an MCU (micro controller unit) 12 that detects an occurrence of an earthquake or calculates a seismic scale on the basis of an acceleration measured by the acceleration sensor 11, a memory 13 that holds a measured acceleration, a threshold value used for determining whether an earthquake has occurred, or other information, an output unit 14 that outputs information indicating occurrence or scale of an earthquake, and an input unit 15 that is an input terminal of the MCU 12. An operation mode related to earthquake detection or measurement of an earthquake acceleration switches depending on a magnitude of the measured acceleration. More specifically, as illustrated in FIG. 5, the operation mode is classified into three types, and is activated in any one of the simple earthquake detection mode, an earthquake detection mode, or an earthquake measurement mode.

In the simple earthquake detection mode, an acceleration is measured, and the measured acceleration data is not saved. The simple earthquake detection mode is activated continuously in a case in which the measured acceleration is equal to or less than a predetermined first threshold value.

In the earthquake detection mode, an acceleration is measured, and the measured acceleration data is saved. The earthquake detection mode is activated continuously in a case in which the acceleration is greater than the first threshold value and equal to or less than a second threshold value. Here, the second threshold value is greater than the first threshold value.

In the earthquake measurement mode, an acceleration and an SI value are measured, and the measured acceleration and SI value are saved. The earthquake measurement mode is activated continuously over a predetermined period in a case in which an acceleration measured in the earthquake detection mode is greater than the second threshold value.

As described above, a seismic sensor 1 includes the MCU 12 and the acceleration sensor 11. In the simple earthquake detection mode, the MCU 12 is in an ON state and the acceleration sensor 11 is in an OFF state. In the earthquake detection mode and the earthquake measurement mode, both the MCU 12 and the acceleration sensor 11 are in the ON state.

Figure 6A:
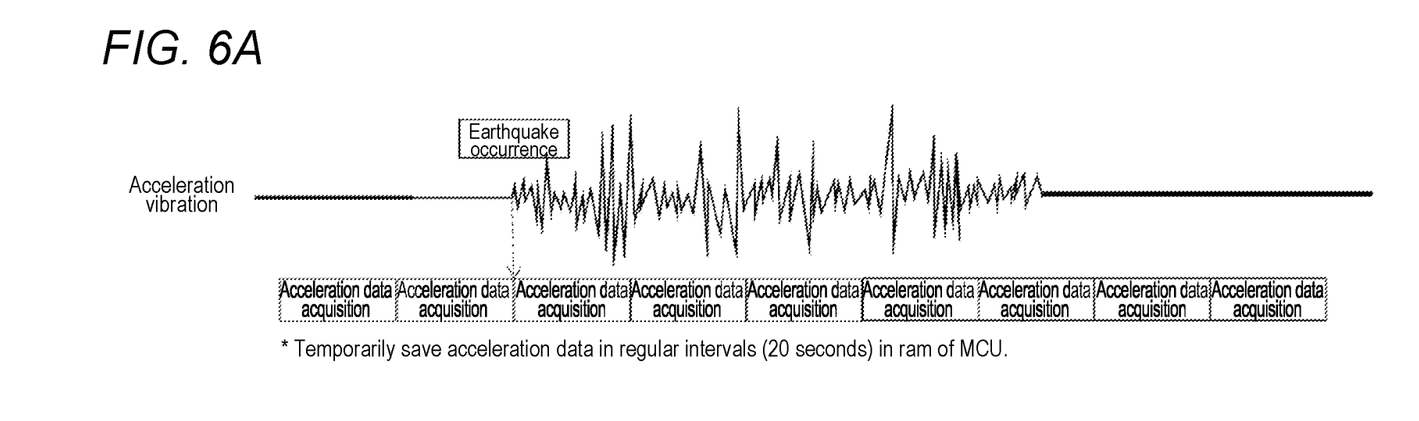
FIG. 6A is a diagram illustrating an aspect of internal operation of a seismic sensor.
Figure 6B:
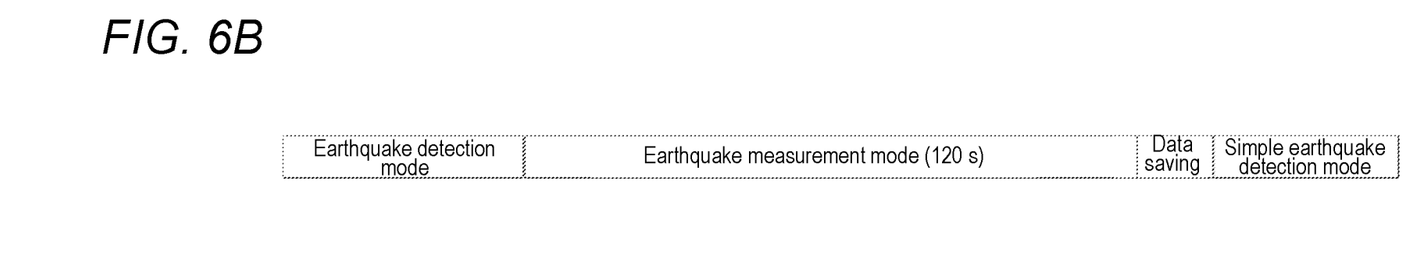
FIG. 6B is a diagram illustrating an aspect of operation of a seismic sensor in accordance with one or more embodiments.

As illustrated in FIGS. 6A and 6B, acceleration data is temporarily saved at regular intervals of 20 seconds (e.g. acceleration data acquisition periods). Periods of data saving triggered by an earthquake are 120 seconds during which the earthquake is detected in the earthquake measurement mode, and may include data during the 20 second period before the occurrence of the earthquake in the earthquake detection mode. The earthquake measurement mode switches to the simple earthquake detection mode after completion of saving measurement data.

Example 1

Hereinafter, a seismic sensor according to one or more embodiments are described with reference to the drawings. One or more embodiments may be applied to a module-type seismic sensor. However, application to another type of seismic sensor, such as a substrate-type seismic sensor is possible. One or more embodiments described below are examples of a module-type seismic sensor, and a configuration of the module-type seismic sensor according to the invention is not limited to the configuration or configurations discussed below.

<Device Configuration>

FIG. 1 is a diagram illustrating a device configuration that is a premise of a seismic sensor according to one or more embodiments. The seismic sensor 1 includes the acceleration sensor 11, the MCU 12, the memory 13, the output unit 14, and the input unit 15.

The acceleration sensor 11 may be, for example, an acceleration sensor using a piezoelectric element or an acceleration sensor that detects capacitance between electrodes. An acceleration measured by the acceleration sensor 11 (also referred to as "sampling") is provided to the MCU 12.

The MCU 12 may be, for example, a general-purpose integrated circuit that acquires an acceleration measured by the acceleration sensor 11 at a predetermined cycle, detects occurrence of an earthquake on the basis of the acceleration, or calculates an index value indicating a seismic scale. The MCU 12 may operate in different power modes, which include an active mode or a sleep mode, depending on a situation. The sleep mode may be a power mode that reduces power consumption as compared to the active mode, in which the MCU 12 operates with functions restricted, such as stopping execution of a command while accepting an interrupt, or stopping clock supply. The active mode may be a power mode in which the MCU 12 may perform processing to determine whether detected vibration is an earthquake or noise, calculates an index value indicating a seismic scale, or performs other processing.

The memory 13 is a temporary storage unit such as a random access memory (RAM) or a non-volatile memory such as an erasable programmable read only memory (EPROM), and holds, for example, a measured acceleration, a threshold value used for determining whether an earthquake has occurred, or other information. The memory 13 may be a memory incorporated in the acceleration sensor 11 or the MCU 12. The output unit 14 is, for example, an output terminal of the MCU 12. In a case in which it is determined that an earthquake has occurred for example, the MCU 12 outputs information indicating the occurrence of the earthquake or a scale of the earthquake to another device via the output unit 14. The output unit 14 may have a communication function. The input unit 15 is an input terminal of the MCU 12. The MCU 12 may receive, for example, operation of a switch (not illustrated), input of a command from another device, or other inputs, via the input unit 15.

A high-pass filter (not illustrated) may be provided between the acceleration sensor 11 and the MCU 12 to remove a gravity component. The MCU 12 may treat an acceleration measured by the acceleration sensor 11 after converting the acceleration into an absolute value of the acceleration based on a predetermined offset.

Figure 2A:
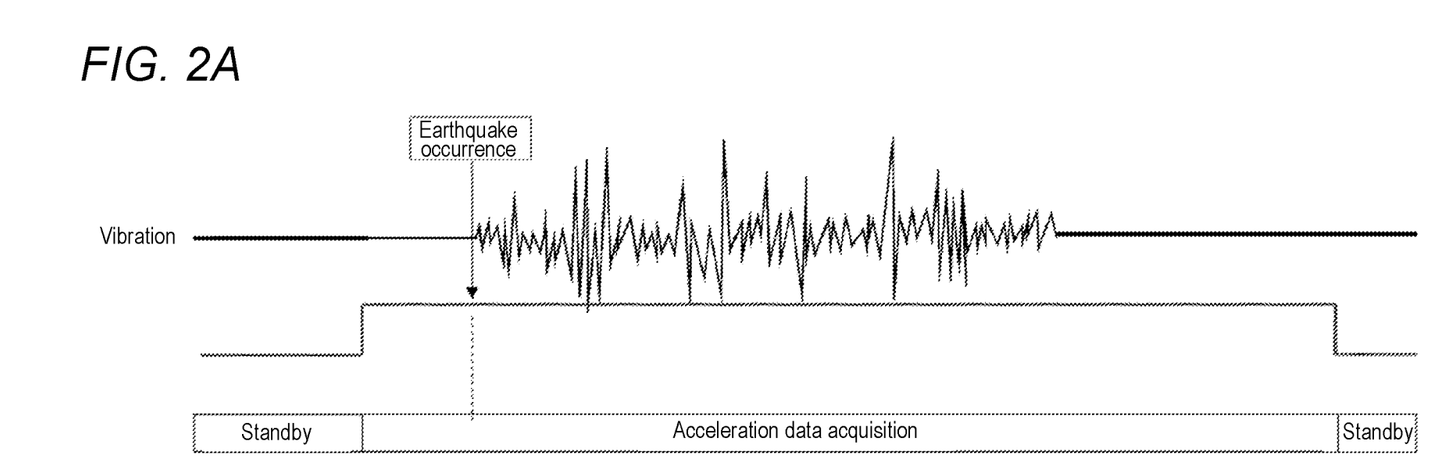
FIGS. 2A and 2B are diagrams each illustrating an actual conventional aspect of operation of an acceleration logger and a seismic sensor in accordance with one or more embodiments.
Figure 2B:
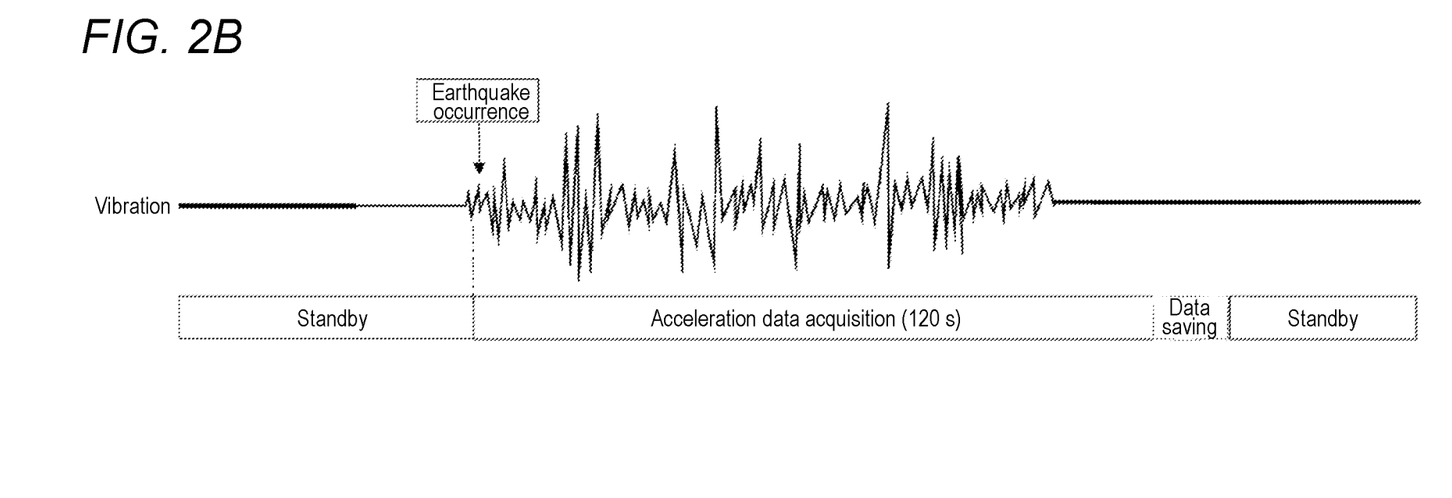

FIGS. 2A and 2B are diagrams each illustrating an actual conventional aspect of operation of an acceleration logger and the seismic sensor 1. FIG. 2A illustrates an overview of operation by the acceleration logger. A general acceleration logger acquires acceleration data triggered by a start signal, or other trigger mechanism. The start signal may include (1) a signal generated by clicking on a start button, (2) a signal output at a predetermined time set by a timer, (3) a signal output when an acceleration signal equal to or greater than a predetermined value is detected, (4) a signal formed by a combination of the above-described signals, or other signals or information. In particular, if using (1) a signal generated by clicking on a start button or (2) a signal output at a predetermined time set by a timer, an enormous amount of data is acquired because acquisition of acceleration data is started regardless of occurrence of an earthquake. FIG. 2B illustrates an overview of operation of a conventional seismic sensor 1. The conventional seismic sensor 1 acquires acceleration data triggered by an occurrence of an earthquake. In that case, the MCU 12 is not activated before the occurrence of the earthquake. Therefore, it may be impossible to acquire data of a vibration acceleration before an earthquake is detected. In addition, in a case in which a threshold value for detecting an occurrence of an earthquake is excessively high, a low-acceleration P wave, which arrives before an S wave when an earthquake occurs, may not be able to be detected. In addition, in a case in which the threshold value is excessively low, noise such as ordinary vibration may be falsely detected as an earthquake.

Figure 3:
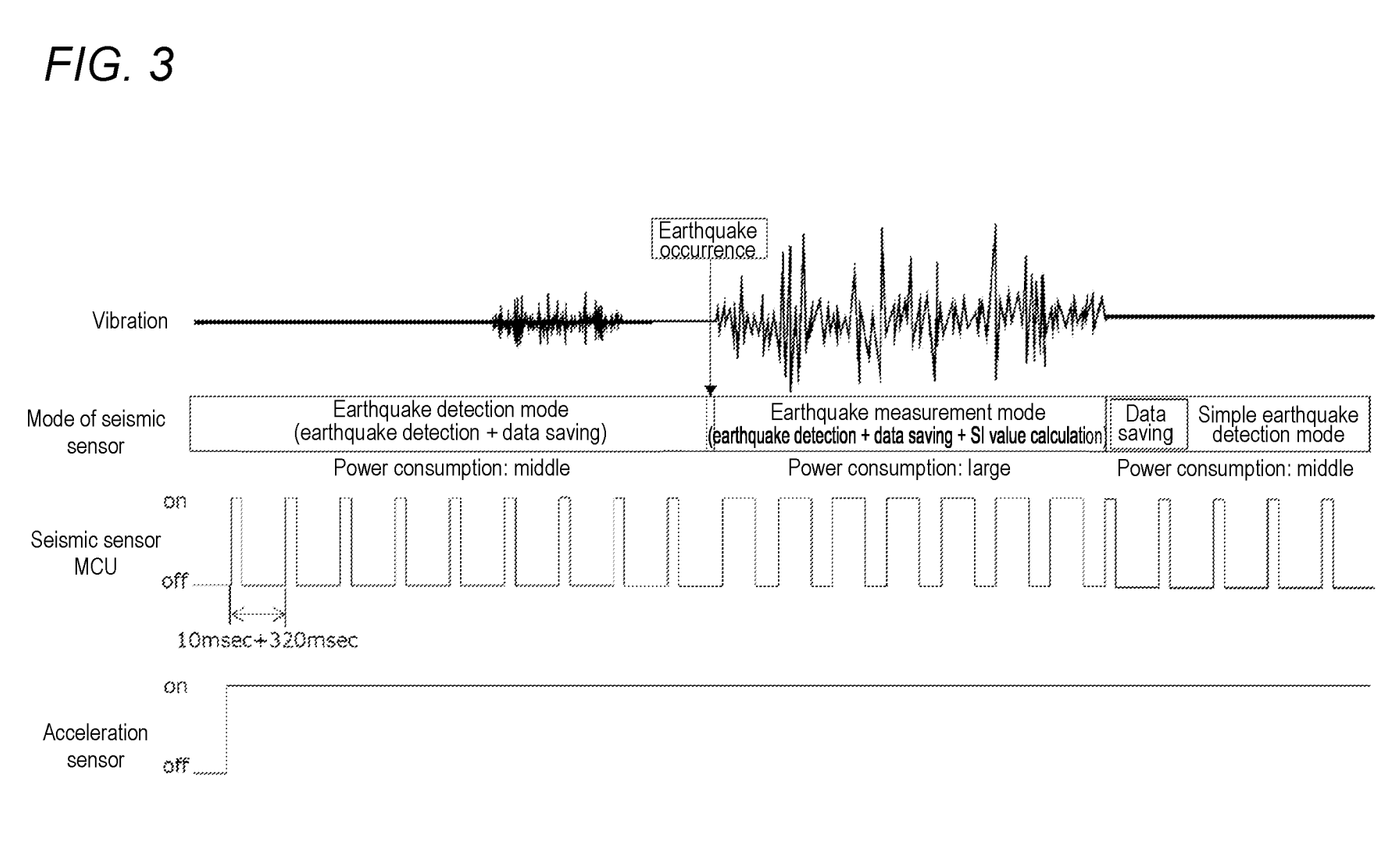
FIG. 3 is a diagram illustrating a case in which a seismic sensor is operated in an earthquake detection mode before detection of an occurrence of an earthquake in accordance with one or more embodiments.

As an aspect of operation of the seismic sensor 1, it is conceivable to operate in the earthquake detection mode that detects an acceleration with less power consumption before an occurrence of an earthquake is detected by the acceleration sensor 11. FIG. 3 illustrates a case in which the above-described seismic sensor 1 is operated in the earthquake detection mode before detection of an occurrence of an earthquake. In FIG. 3, the acceleration sensor 11 is always in the ON state, and the acquired acceleration data is temporarily accumulated in a RAM (not illustrated) in the acceleration sensor 11. In the earthquake detection mode, the MCU 12 receives acceleration data from the acceleration sensor 11. The MCU 12 repeats staying in the ON state for 10 msec and staying in the OFF state for 320 msec. That is, the MCU 12 acquires acceleration data from the RAM in the acceleration sensor 11 at a rate of 10 msec every 330 msec. The acquired acceleration data is accumulated in the RAM (not illustrated) of the MCU 12 for 20 seconds. After the 20 seconds, the accumulated data is erased, and accumulation of acceleration data of 20 seconds starts again.

In the earthquake measurement mode, the MCU 12 turns ON at the same timing as the earthquake detection mode, receives acceleration data from the RAM of the acceleration sensor 11, and saves the acceleration data in the RAM of the MCU 12. At the same time, an SI value represented by Expression (1) is also calculated.

$$SI = \frac{1}{2.4} \int_{0.1}^{2.5} Sv(T, h) dT \qquad (1)$$

The above-described SI value is an index indicating destructive force of a seismic motion with average of an integral value of a velocity response spectrum between 0.1 and 2.5 seconds, which is a natural period of a highly rigid structure. It should be noted that $S_v$ represents a velocity response spectrum, T represents a cycle, and h represents an attenuation constant. Therefore, a period during which the MCU 12 is in an ON state is longer than a period in the earthquake detection mode as illustrated in FIG. 3, and a period during which the MCU 12 is in an OFF state is shorter than a period in the earthquake detection mode. Therefore, power consumption in the earthquake measurement mode is larger than power consumption in the earthquake detection mode.

The above described case is also inefficient, because an enormous amount of data is acquired before an occurrence of an earthquake is detected by the acceleration sensor 11, and longer activation time of the MCU 12 results in an increase in power consumption.

Based on the above-described problems, hereinafter, the seismic sensor 1 described below according to the present example is a seismic sensor operated in a mode with reduced power consumption before an earthquake is detected, and including a logger function capable of acquiring data of a vibration acceleration before the earthquake is detected. Here, the seismic sensor including the logger function is also assumed to correspond to the seismic sensor 1.

Figure 4:
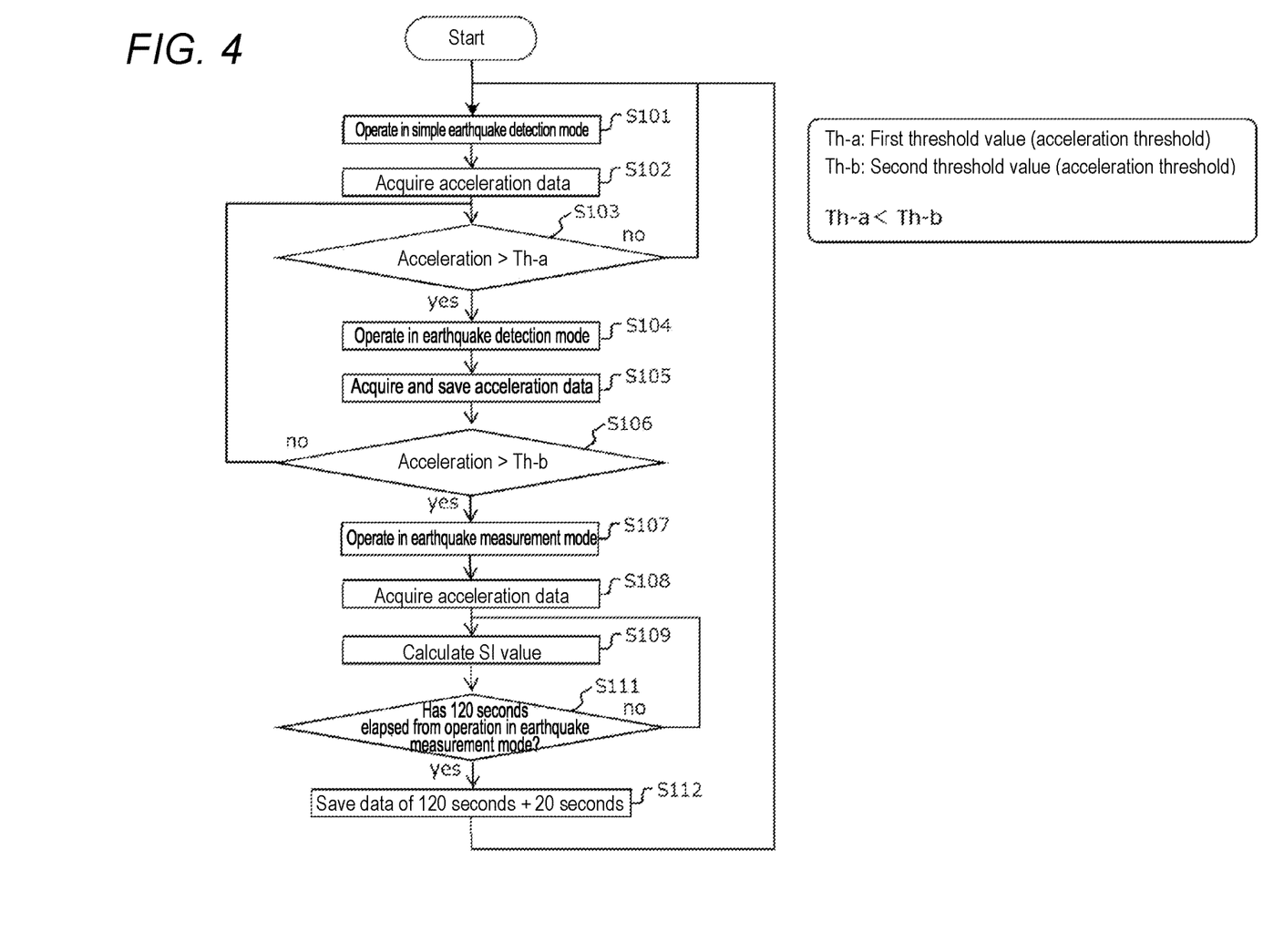
FIG. 4 is a diagram illustrating a processing flow related to an operation mode of a seismic sensor in accordance with one or more embodiments.

FIG. 4 is a processing flow diagram related to an operation mode of the seismic sensor 1 in the present example. The above described flow functions when a program stored in the memory 13 of the seismic sensor 1 is executed by the MCU 12. In the seismic sensor 1, a mode related to earthquake detection or measurement of an earthquake acceleration switches depending on a magnitude of measured acceleration. The mode is classified into three types, and is activated in any one of the simple earthquake detection mode, the earthquake detection mode, or the earthquake measurement mode. When the above described flow is executed, the seismic sensor 1 first operates in the simple earthquake detection mode (FIG. 4: S101). Next, in the acceleration sensor 11, acceleration data is acquired in the simple earthquake detection mode (S102). Acceleration data is not saved in the simple earthquake detection mode.

The acceleration data acquired in the processing in S102 is compared with a predetermined first threshold value (acceleration threshold) previously set in the seismic sensor 1 (S103). If the acceleration acquired in the simple earthquake detection mode is equal to or less than the first threshold value (S103: no), the simple earthquake detection mode is continued. Meanwhile if the acceleration acquired in the simple earthquake detection mode is greater than the first threshold value (S103: yes), the seismic sensor 1 switches to the earthquake detection mode (S104).

After the seismic sensor 1 switches to the earthquake detection mode, the acceleration data is acquired and saved (S105). The acquired acceleration is compared with a predetermined second threshold value (acceleration threshold) previously set in the seismic sensor 1 (S106). Here, the second threshold value is greater than the first threshold value. If the acceleration acquired in the earthquake detection mode is equal to or less than the second threshold value (S106: no), the processing returns to S103. In S103, comparison with the first threshold value (acceleration threshold) is executed again (S103). If the acceleration acquired in S105 immediately before is equal to or less than the first threshold value (S103: no), the seismic sensor 1 switches to the simple earthquake detection mode. Meanwhile, if the acceleration acquired in S105 immediately before is greater than the first threshold value (S103: yes), the earthquake detection mode is continued (S104). Meanwhile if the acceleration acquired in the earthquake detection mode is greater than the second threshold value (S106: yes), the seismic sensor 1 switches to the earthquake measurement mode (S107). Here, the earthquake measurement mode corresponds to a measurement mode.

After the seismic sensor 1 switches to the earthquake measurement mode, acceleration data acquisition is executed (S108). An SI value is calculated from the acquired acceleration (S109). In addition, it is determined whether 120 seconds have elapsed after switching to the earthquake measurement mode (S111). If 120 seconds have not elapsed yet (S111: no), the processing returns to S108 and is executed from the acceleration data acquisition repeatedly. If 120 seconds have elapsed (S111: yes), data of the 120 seconds in the earthquake measurement mode and the data of 20 seconds in the earthquake detection mode are saved (S112), and the seismic sensor 1 switches to the simple earthquake detection mode again.

FIG. 5 is a diagram for describing the operation mode of the seismic sensor 1 in the present example. Switching between the simple earthquake detection mode, the earthquake detection mode, and the earthquake measurement mode is as illustrated in the processing flow diagram in FIG. 4. When the seismic sensor 1 is in operation, the acceleration sensor 11 is in a state of always ON in any of the modes, and the MCU 12 is in the OFF state in the simple earthquake detection mode. Meanwhile, when the seismic sensor 1 is in operation, the acceleration sensor 11 is in the ON state (intermittently turned ON) in the earthquake detection mode and the earthquake measurement mode.

Therefore, power consumption of the seismic sensor 1 can be reduced most in the simple earthquake detection mode in a state in which the acceleration sensor 11 is in the ON state and the MCU 12 is in the OFF state. In addition, when the simple earthquake detection mode switches to the earthquake detection mode, the MCU 12 shifts to the ON state. Therefore, the earthquake detection mode can be used as a logger function before an occurrence of an earthquake.

FIGS. 6A and 6B are diagrams for describing acquisition of acceleration data of the seismic sensor 1 in the present example. FIG. 6A illustrates an aspect of internal operation of the seismic sensor 1. FIG. 6B illustrates an aspect of operation of the seismic sensor 1. As illustrated in FIG. 6A, the acceleration measurement data acquired by the acceleration sensor 11 is temporarily saved in the RAM (not illustrated) in the MCU 12 at regular intervals of 20 seconds. As illustrated in FIG. 6B, periods of measurement data saving triggered by an earthquake are 120 seconds during which the earthquake is detected in the earthquake measurement mode, and 20 seconds in the earthquake detection mode before the occurrence of the earthquake. Therefore, the seismic sensor 1 can record acceleration data before an occurrence of an earthquake as well as acceleration data of a period during the earthquake. Acceleration data of a period of 120 seconds during which an earthquake is detected in the earthquake measurement mode and 20 seconds in the earthquake detection mode before an occurrence of an earthquake is reset after measurement data is saved.

For comparison of components according to one or more embodiments and components in Example, the components according to one or more embodiments may be described below with reference signs in the drawings.

An Embodiment

A seismic sensor (1) in which an operation mode related to earthquake detection or measurement of an earthquake acceleration switches according to a measured acceleration, the seismic sensor including a simple earthquake detection mode in which the measured acceleration data is not saved, the simple earthquake detection mode being continued in a case in which the measured acceleration is equal to or less than a predetermined first threshold value, an earthquake detection mode in which the measured acceleration data is saved, the earthquake detection mode being continued in a case in which the acceleration measured in the simple earthquake detection mode is greater than the first threshold value and equal to or less than a second threshold value that is greater than the first threshold value, and an earthquake measurement mode in which the acceleration data and a spectrum intensity (SI) value are measured and saved, the earthquake measurement mode being continued in a case in which the acceleration measured in the earthquake detection mode is greater than the second threshold value.

The invention claimed is:

1. A seismic sensor that switches an operation mode related to earthquake detection or measurement of an earthquake acceleration according to a measured acceleration, the seismic sensor comprising:
   a simple earthquake detection mode in which measured acceleration data is not saved, the simple earthquake detection mode being continued in a case in which the measured acceleration is equal to or less than a predetermined first threshold value;
   an earthquake detection mode in which the measured acceleration data is saved, the earthquake detection mode being continued in a case in which the acceleration measured in the simple earthquake detection mode is greater than the first threshold value and equal to or less than a second threshold value that is greater than the first threshold value; and
   an earthquake measurement mode in which the acceleration data and a spectrum intensity (SI) value are measured and saved, the earthquake measurement mode being continued in a case in which the acceleration measured in the earthquake detection mode is greater than the second threshold value.

2. The seismic sensor according to claim 1, the seismic sensor further comprising an information processing device and an acceleration sensor,
   wherein, in the simple earthquake detection mode, the information processing device is in an OFF state, and the acceleration sensor is in an ON state, and in the earthquake detection mode and in the earthquake measurement mode, the information processing device is in a state of intermittent drive, and the acceleration sensor is in an ON state.

3. The seismic sensor according to claim 1, the seismic sensor further comprising a memory configured to save the acceleration data,
   wherein data saving for the earthquake detection mode and the earthquake measurement mode is divided into periods according to a predetermined acceleration data acquisition period, in which acceleration data measured by the acceleration sensor is temporarily saved in a memory in the information processing device every time the acceleration data acquisition period elapses, and the acceleration data temporarily saved in the memory in the information processing device is saved in the memory after the earthquake measurement mode ends.

4. The seismic sensor according to claim 2, the seismic sensor further comprising a memory configured to save the acceleration data,
   wherein data saving for the earthquake detection mode and the earthquake measurement mode is divided into periods according to a predetermined acceleration data acquisition period, in which acceleration data measured by the acceleration sensor is temporarily saved in a memory in the information processing device every time the acceleration data acquisition period elapses, and the acceleration data temporarily saved in the memory in the information processing device is saved in the memory after the earthquake measurement mode ends.

5. The seismic sensor according to claim 3, wherein the acceleration data acquisition period is 20 seconds, and the acceleration data saved in the memory after the earthquake measurement mode ends comprises the acceleration data acquired during all of the periods of the data saving in the earthquake measurement mode and acceleration data acquired during a period of the data saving immediately before an occurrence of an earthquake in the earthquake detection mode.

6. The seismic sensor according to claim 4, wherein the acceleration data acquisition period is 20 seconds, and the acceleration data saved in the memory after the earthquake measurement mode ends comprises the acceleration data acquired during all of the periods of the data saving in the earthquake measurement mode and acceleration data acquired during a period of the data saving immediately before an occurrence of an earthquake in the earthquake detection mode.

7. The seismic sensor according to claim 3, wherein the acceleration data acquisition period is 20 seconds, and the acceleration data saved in the memory after the earthquake measurement mode ends comprises the acceleration data acquired during all of the periods of the data saving in the earthquake measurement mode and acceleration data acquired during a period of the data saving immediately before an occurrence of an earthquake in the earthquake detection mode.

8. The seismic sensor according to claim 4, wherein the acceleration data acquisition period is 20 seconds, and the acceleration data saved in the memory after the earthquake measurement mode ends comprises the acceleration data acquired during all of the periods of the data saving in the earthquake measurement mode and acceleration data acquired during a period of the data saving immediately before an occurrence of an earthquake in the earthquake detection mode.

9. The seismic sensor according to claim 1, wherein
   the acceleration data is acquired according to data acquisition periods, and
   the seismic sensor switches to the simple earthquake detection mode after completion of saving acceleration data acquired during all of the data acquisition periods in the earthquake measurement mode.

10. The seismic sensor according to claim 2, wherein
    the acceleration data is acquired according to data acquisition periods, and
    the seismic sensor switching to the simple earthquake detection mode again after completion of saving acceleration data acquired during all of the data acquisition periods in the earthquake measurement mode.

11. The seismic sensor according to claim 3, wherein the seismic sensor switches to the simple earthquake detection mode again after completion of saving acceleration data acquired during all of the data acquisition periods in the earthquake measurement mode.

12. The seismic sensor according to claim 5, the seismic sensor switching to the simple earthquake detection mode again after completion of saving acceleration data acquired during the all data acquisition period in the earthquake measurement mode.

13. The seismic sensor according to claim 6, the seismic sensor switching to the simple earthquake detection mode again after completion of saving acceleration data acquired during the all data acquisition period in the earthquake measurement mode.

14. The seismic sensor according to claim 7, the seismic sensor switching to the simple earthquake detection mode again after completion of saving acceleration data acquired during the all data acquisition period in the earthquake measurement mode.

15. The seismic sensor according to claim 8, the seismic sensor switching to the simple earthquake detection mode again after completion of saving acceleration data acquired during the all data acquisition period in the earthquake measurement mode.

\* \* \* \* \*